United States Patent [19]

Nelson

[11] 4,418,450
[45] Dec. 6, 1983

[54] WEB FITTING WITH WEBBING PROTECTOR

[75] Inventor: Roger Nelson, Howell, Mich.

[73] Assignee: Aeroquip Corporation, Jackson, Mich.

[21] Appl. No.: 263,973

[22] Filed: May 15, 1981

[51] Int. Cl.³ .................. B61D 45/00; B61D 63/00
[52] U.S. Cl. .................. 24/265 CD; 108/55.5; 248/499; 410/96; 410/106
[58] Field of Search .......... 24/182, 183, 197, 225, 24/226, 265 R, 265 CD; 248/499, 505; 410/101–117, 96, 97; 108/55.5

[56] References Cited

U.S. PATENT DOCUMENTS 2,845,680  8/1958  Elsner .................. 24/265 R
2,984,885  5/1961  Elsner .................. 24/265
3,017,679  1/1962  Elsner .................. 24/201

FOREIGN PATENT DOCUMENTS 213316  5/1967  Sweden .................. 24/225

Primary Examiner—Bruce H. Stoner, Jr.
Assistant Examiner—David F. Hubbuch
Attorney, Agent, or Firm—Beaman & Beaman

[57] ABSTRACT

The invention pertains to a cargo control fitting utilizing webs wherein an identical pair of fittings are used in conjunction with a web loop, and the fittings include locking tabs received within an opening defined in an anchoring support member. The fittings include an outer edge located within the web loop and to protect the web loop from being crushed against this outer edge protecting extensions are defined on the fitting which extend beyond the outer edge a distance at least equal to the web thickness. Further, the extensions are obliquely disposed to the plane of the fitting to laterally extend a distance from the fitting side equal to the web thickness to protect the web from also being crushed against the fitting lateral side.

6 Claims, 7 Drawing Figures

U.S. Patent
Dec. 6, 1983
4,418,450
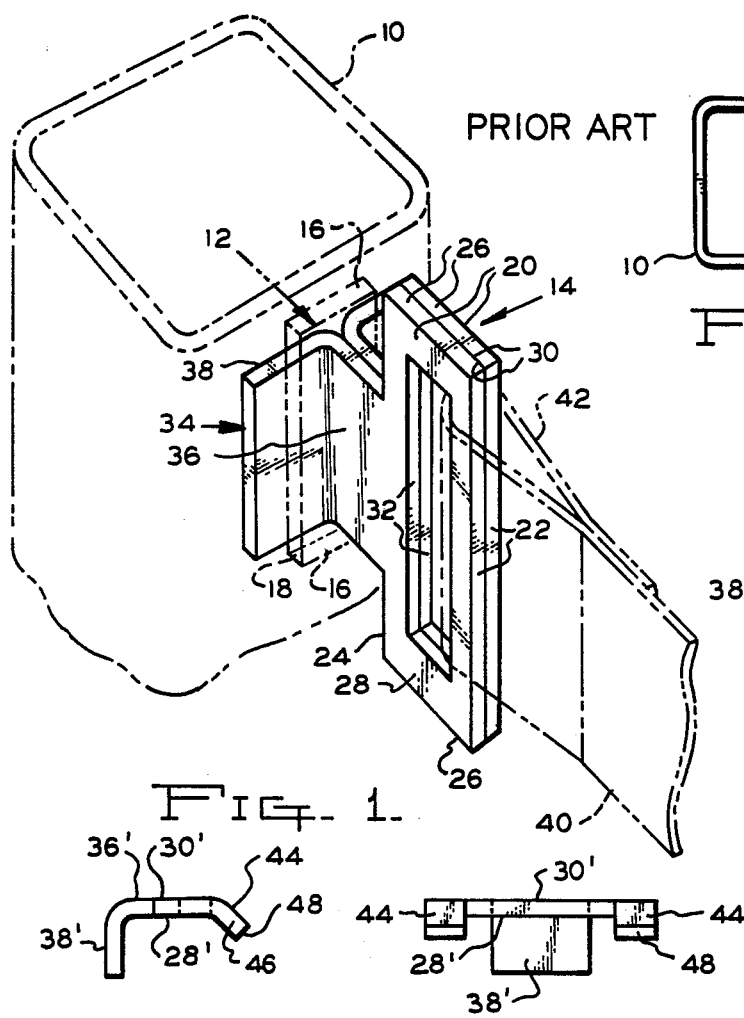
PRIOR ART
Fig. 1.
Fig. 2.
Fig. 3.
Fig. 4.
Fig. 5.
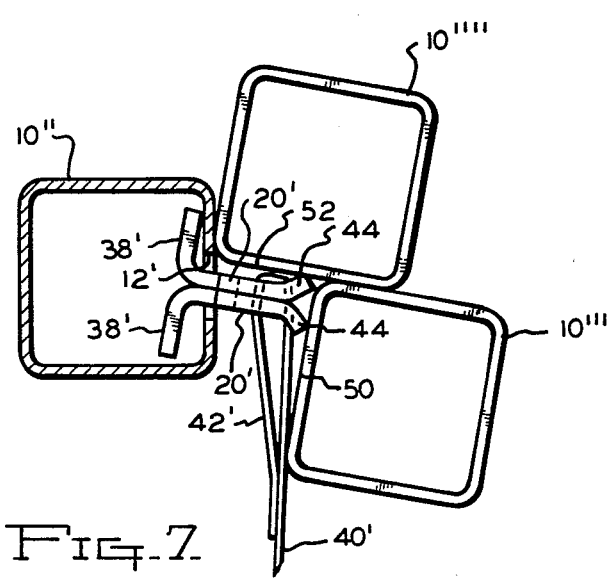
Fig. 7.
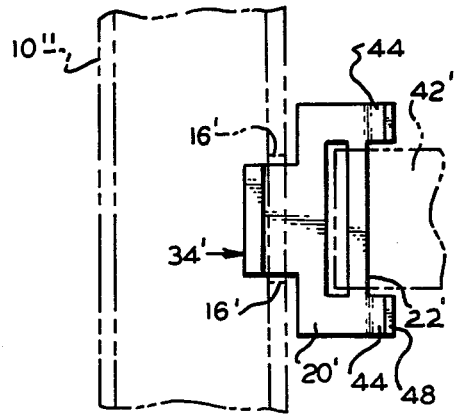
Fig. 6.

4,418,450

WEB FITTING WITH WEBBING PROTECTOR

BACKGROUND OF THE INVENTION

Web straps are often utilized in cargo control apparatus such as employed to position cargo within a truck body, cargo container, aircraft cargo compartment, or the like, and such cargo control webs are also employed with pallets and material handling racks to reinforce and support portions thereof.

Material handling racks or pallets utilizing vertically extending corner box posts interconnected by wire or the like employ web straps intermediate the corner posts to strengthen the material handling racks and prevent the corner posts from being outwardly displaced by the confined material. One of the popular fittings used with such material handling racks for attaching the web straps to the corner posts consists of an identical pair of stamped metal fittings each having a web receiving opening defined therein and each including a locking tab having a portion transversely disposed to the portion in which the web opening is defined. By placing such fittings in back-to-back relationship, and separately inserting the locking tabs within rectangular openings within the pallet corner posts, a pair of such fittings located within a web loop will firmly anchor the web to a corner whereby the web may be tensioned to produce the desired support and reinforcement function.

Fittings of this type presently available include an outer edge which is parallel to the fitting web receiving opening, and about which the web loop will often pass. When using cargo pallets and containers of the type using such fittings the containers may be loosely located within the cargo compartment, particularly when the pallets are empty, and the corner posts of adjacent pallets will impact against, and rub against, the fittings of adjacent pallet corner posts. This action often results in the web being crushed against its associated fitting outer edge causing the web to be severely worn, or partially severed, prematurely rendering the web end fitting assembly unusable, and requiring replacement.

It is an object of the invention to provide a fitting for use with web straps wherein means are defined upon the fitting to prevent the web from being crushed against an associated fitting surface, and whereby the web is protected against abrasion and wear due to contact with adjacent structure.

A further object of the invention is to provide a fitting for use with web straps wherein the fitting includes an outer edge and a lateral outer surface, and inexpensive means are homogeneously defined upon the fitting for protecting the web against being crushed against the outer edge or lateral outer side by adjacent structure.

Yet another object of the invention is to provide a fitting for webs which is of an economical construction, requires little additional material with respect to similar prior art devices, yet protects the associated web from being crushed or worn.

In the practice of the invention the web fitting includes a pair of identical planar bodies having an elongated web receiving opening defined therein. The bodies include locking tabs extending therefrom whereby the fitting may be anchored to a support member, and the bodies include an outer edge parallel to the length of the web receiving opening, and an outer surface.

Extensions are defined upon the fitting components adjacent the body end edges, and offset with respect to the web receiving opening, which extend beyond the fitting outer edge a distance sufficient to protect a web engaging said outer edge from being crushed by adjacent structure engaging the fitting. Further, the extensions are obliquely disposed with respect to the plane of the body in the direction of the outer side whereby the extensions also project from the outer side a distance at least equal to the thickness of the web and prevent crushing of the web against the fitting outer side.

In the practice of the invention little additional body material is required to achieve the desired purpose, and the invention can be practiced economically and with only slightly greater cost than similar fittings not utilizing the advantages of the invention.

BRIEF DESCRIPTION OF THE DRAWINGS

The aforementioned objects and advantages of the invention will be appreciated from the following description and accompanying drawings wherein:

FIG. 1 is a perspective view of a web fitting constructed in accord with the prior art illustrating the web loop in phantom lines, FIG. 2 is a top plan sectional view of a fitting in accord with the prior art illustrating a typical situation whereby the webbing may be crushed or cut, FIG. 3 is a perspective view of a web fitting in accord with the invention, FIG. 4 is a top plan view of a web fitting in accord with the invention, FIG. 5 is an end view of the new fitting as taken from the right of FIG. 4, FIG. 6 is an elevational, sectional, detail enlarged side view of an assembled web fitting in accord with the invention, and FIG. 7 is a plan sectional view illustrating the assembly of a web fitting in accord with the invention and illustrating how the extensions protect the web against engagement by adjacent box posts.

DESCRIPTION OF THE PREFERRED EMBODIMENT

Web fittings in accord with the prior art are illustrated in FIGS. 1 and 2, in order to appreciate the deficiencies of such fittings and a type of occurrence which will crush, sever or wear the webbing.

The web fitting illustrated is particularly suitable for use with cargo control devices wherein web straps are employed to position cargo within a cargo space, or are used to strengthen and reinforce material handling pallets and the like. A particular application of a web fitting which benefits from the inventive concepts lies in the use of the fittings with pallet type material handling apparatus which includes vertically extending corner box posts 10 disposed about the pallet, not shown, and located at the corners thereof. By utilizing web straps intermediate these box corner posts the posts can be prevented from being excessively displaced outwardly when the pallet is loaded, and the pallet load can be retained upon the pallet.

The box posts 10 include a plurality of rectangular openings 12 for selectively receiving a web fitting 14, and an opening 12 consists of parallel upper and lower edges 16 which define the height of the opening, and vertically extending parallel edges 18 define the opening width. The box posts 10 are formed of steel and include an inner surface and the openings 12 may be placed upon several surfaces and evenly spaced thereon.

The fitting 14 consists of a pair of identical steel bodies 20, usually formed of stamped plate. Only one of the fitting bodies 20 will be described in detail, it being understood that the other body is identical thereto and the bodies are assembled by reversing one with respect to the other and placing the bodies in back-to-back relationship.

The fitting body 20 is planar and of a generally rectangular configuration including an outer edge 22, an inner edge 24, end edges 26, an outer surface 28, and an inner surface 30. An elongated web receiving opening 32 is defined within the body 20 and is of a generally rectangular configuration, and the length of the opening 32 is parallel to the outer edge 22.

A locking tab 34 extends from the inner edge 24 centrally located between the end edges 26, and the locking tab includes a portion 36 which lies within the plane of the body 20, and the tab portion 38 is bent at 90° with respect to the portion 36. The vertical height of the locking tab 34 is slightly less than the spacing between the box post opening upper and lower edges 16, and the horizontal width of the locking tab portion 38 is usually substantially equal to the width of the opening 12 between edges 18, and needs to be of such width that twice the hickness of portion 36 plus the width of portion 38 is greater than the width of the opening in order to prevent accidental release of the fitting 14 from the box post 10.

The pair of fitting bodies 20 are placed in back-to-back relationship with inner surfaces 30 engaging, as shown in FIG. 1, and a web 40 is threaded through the openings 32, and sewn back upon itself to define a loop 42. The loop 42, therefore, loosely mounts the fitting bodies 20 upon the web, and it is possible to twist the bodies 20 to insert the free end of the portion 38 into the opening 12 wherein the portion 38 is substantially perpendicular to the plane of the opening 12, and once the locking tab portion 38 has been inserted in the opening the fitting is rotated 90° about a vertical axis to the relationship of FIG. 1. After both locking tabs 34 are inserted into opening 12 the body portions 20 may be oriented parallel to each other in back-to-back relationship. So assembled, the locking tab portions 38 will engage the box post inner surface adjacent opening 12, and as long as the fitting bodies 20 are maintained in back-to-back relationship the fitting will be positively anchored to the box post regardless of the direction of tension within the web 40. Tension within the web tends to force the fitting bodies 20 together in parallel relationship, and insures that the locking tabs cannot be removed from the box post opening 12.

In FIG. 2, a typical relationship between the fitting components and box post is shown wherein a box post 10' of an adjacent pallet has engaged the web fitting 14. In this instance it will be appreciated that the box post 10' will be engaging and crushing that portion of the web loop 42 which passes over the body outer edge 22 extending outwardly the furthest, and due to the vibration of vehicle movement, or the like, chafing of the web loop will occur at the outer edge 22, particularly in view of the high unit pressures existing. Also, it often occurs that the box post 10' of an adjacent pallet will be violently thrust against the fittings 14 of the adjacent pallet engaging the web at the fitting outer edge 22, and such force may be sufficient to sever all, or a portion of the web, at the fitting outer edge. Accordingly, it will be appreciated that the prior art web fittings of this type offer no protection against crushing of the web at the outer edge of the fitting, and if a box post 10' engages a body 20 from a lateral direction it is also possible to crush and wear the web fitting against an outer surface 28.

In the practice of the invention a fitting of the aforedescribed type is utilized which includes structure which protects the web loop from engagement with other box posts or adjacent structure in order to prevent web wear, chafing and cutting. In the fitting described with respect to FIGS. 3-7 many of the structural relationships and configurations are identical to those described with respect to the structure shown in FIGS. 1 and 2, and similar components are identified by primed reference numerals.

The fittings of FIGS. 3-7 differs from that illustrated in FIGS. 1 and 2 in that a pair of extensions 44 are defined upon the body 20'. The extensions 44 are located adjacent the body and end edges 26' and include an outer edge 46 which is a continuation of the associated body end edge 26'. The vertical dimension of the extensions 44 in the direction of the length of the body 20' is substantially equal to the dimension of the body intermediate the end of the web receiving opening 32' and the adjacent end edge 26', and in this manner it will be appreciated that the extensions 44 are offset, or misaligned, with respect to the web receiving opening 32'.

The body outer edge 22' comprises a recess intermediate the extensions 44, and the extensions outer ends 48 extend outwardly beyond the outer edge 22' a distance preferably at least equal to the thickness of the web 40' with which the fitting is employed. Thus, when the web engages the fitting outer surface 22' it will be protected against crushing thereagainst by the extensions 44.

The extensions 44 are also obliquely bent or offset with respect to the plane of the body 20' in the direction of the outer surface 28'. This angle of deflection is sufficient to locate the outermost corner of the extension outer ends 48 at a distance from the outer surface 28' adjacent the outer edge 22', and web receiving opening 32', which is preferably at least equal to the thickness of the web whereby the extensions 44 will also protect the web against being crushed or compressed against the fitting outer surface 28'.

The fitting bodies 20' are used in pairs identical to the manner described with respect to FIG. 1, and the web 40' is fed through the openings 32', and sewn to form a loop 42', FIGS. 6 and 7, whereby two of the fitting bodies will be located within the loop in back-to-back relationship. The fittings are mounted upon a box post 10" by inserting the locking tabs 34' through the opening 12', FIG. 7, and the improved fitting of the invention will operate and function in the manner of the fitting of FIG. 1 with respect to serving as an anchor for the web. Of course, when the tension forces within the web are lateral with respect to the plane of the body portions 20' such as FIG. 7, a portion of the web loop 42' will lie within the recess defined by the outer edge 22'.

In FIG. 7 two box posts are shown at different locations with respect to the fitting to illustrate how the extensions 44 protect the web loop against abrasion, crushing and severing. The box post 10''' illustrates how the extensions 44 will engage a box post which approaches the fitting in the general direction of the plane of the bodies 20', such as in FIG. 2. The extensions 44 will engage the box post surface 50, and as the extensions will prevent the box member surface 50 from engaging the web loop no engagement with the web occurs and the web is protected.

The box post 10'''' illustrates the relationship if a box post engages the fitting from a lateral direction. As the extensions 44 project from the associated outer side 28' a distance greater than the web thickness the web extension ends 48 will engage the box post surface 52 preventing the box post 10'''' from engaging the web loop passing about the outer surface 28', and preventing crushing, wear or severing of the web loop.

From the above it will be appreciated that the use of the extensions 44 on the fitting bodies 20', while adding very little to the cost of producing the fittings, makes a significant contribution with respect to protecting the webbing from inadvertent damage. The likelihood of the web being damaged is greatest when the material handling pallets upon which the box posts are mounted are empty, and the pallets are being returned for reuse. It is the practice to loosely locate the pallets and material handling apparatus within a truck cargo bed, and the pallets will freely move about engaging each other and creating the conditions shown in FIGS. 2 and 7.

It is appreciated that various modifications to the inventive concepts may be apparent to those skilled in the art without departing from the spirit and scope of the invention.

I claim:

1. In a fitting for attaching a web to a support wherein the support includes a wall having an inner side and an opening defined therein of fixed height and width, the fitting comprising a pair of identical web loop retainer bodies, each having a substantially planar portion having inner and outer surfaces, an outer edge, an inner edge, a web receiving opening defined therein having ends and a length substantially parallel to said outer edge, and a locking tab extending from said inner edge having a first planar portion and a second portion transversely disposed to said first portion and extending in the direction of said outer surface, said locking tab portions adapted to be received within said support opening in a locking relationship, a pair of retainers being assembled in back-to-back relationship with said planar portion inner surfaces in engagement and a web extending through the aligned web receiving openings defining a loop, the improvement comprising, extensions defined on said retainer planar portions extending beyond said outer edge thereof a distance at least as great as the web thickness, said extensions being offset with respect to the associated web receiving opening ends whereby said extensions are separated by a distance at least as great as the length of the web receiving opening and extend beyond webbing passing over said outer edge to protect the webbing from being crushed against said outer edge.

2. In a fitting for attaching a web as in claim 1, said retainer body planar portions having end edges, said extensions partially defining said end edges.

3. In a fitting for attaching a web as in claim 1, said extensions being obliquely offset with respect to the plane of the associated retainer body planar portion in the direction of the associated planar portion outer surface to extend beyond said associated outer surface a distance at least equal to the web thickness to protect the web from being crushed against said associated outer surface.

4. In a fitting for attaching a web as in claim 3, wherein said retainer bodies are formed of stamped steel sheet, and said extensions are bent from the plane of the associated planar portion.

5. In a fitting retainer to be used in pairs with a web loop, a substantially planar body having inner and outer surfaces, an outer edge, an inner edge, end edges, an elongated web receiving opening having ends and a length substantially parallel to said outer edge, and a locking tab extending from said inner edge intermediate said end edges having a portion transversely disposed to the plane of said body, the improvement comprising, an extension defined on said body adjacent each end edge and off-set with respect to said web receiving opening ends and extending beyond said outer edge a distance at least as great as the thickness of the web to be used with said body whereby said extensions extend beyond webbing passing over said outer edge to protect the webbing from being crushed against the outer edge, said extensions being separated by a distance at least as great as the length of the web receiving opening.

6. In a fitting as in claim 5 wherein said extensions are obliquely offset with respect to the plane of the body in the direction of the outer surface to extend beyond said outer surface a distance at least as great as the thickness of the web to be used with said body to protect the web from being crushed against said outer side.

* * * * *